United States Patent
Kashiwagi

(10) Patent No.: US 8,731,307 B2
(45) Date of Patent: May 20, 2014

(54) INFORMATION PROCESSING APPARATUS, INFORMATION PROCESSING METHOD, AND PROGRAM

(75) Inventor: Akifumi Kashiwagi, Tokyo (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 13/038,625

(22) Filed: Mar. 2, 2011

(65) Prior Publication Data

US 2011/0222782 A1     Sep. 15, 2011

(30) Foreign Application Priority Data

Mar. 10, 2010   (JP) ................................ 2010-052919

(51) Int. Cl.
  G06K 9/68      (2006.01)
(52) U.S. Cl.
  USPC ........... 382/218; 382/157; 382/232; 382/305; 382/190; 382/195; 382/236; 382/173; 382/192
(58) Field of Classification Search
  CPC .................... G06F 17/30247; G06F 17/30781; G06F 17/30858
  USPC ......... 382/218, 157, 232, 305, 190, 195, 236, 382/173, 192
  See application file for complete search history.

(56) References Cited

U.S. PATENT DOCUMENTS

| 7,676,820 | B2 * | 3/2010 | Snijder et al. .................... 725/19 |
| 2001/0004739 | A1 * | 6/2001 | Sekiguchi et al. ............ 707/100 |
| 2002/0006221 | A1 | 1/2002 | Shin et al. |
| 2006/0184963 | A1 | 8/2006 | Snijder et al. |
| 2008/0298643 | A1 * | 12/2008 | Lawther et al. ................ 382/118 |
| 2010/0005070 | A1 * | 1/2010 | Moriya et al. ..................... 707/3 |
| 2010/0111501 | A1 * | 5/2010 | Kashima ........................ 386/108 |

FOREIGN PATENT DOCUMENTS

| JP | 11-308581 | 11/1999 |
| JP | 2002-032761 | 1/2002 |
| JP | 2002-203245 | 7/2002 |
| JP | 2006-514451 | 4/2006 |
| JP | 2006-285907 | 10/2006 |
| JP | 2009-070278 | 4/2009 |
| JP | 2009-147603 | 7/2009 |

* cited by examiner

Primary Examiner — Mike Rahmjoo
(74) Attorney, Agent, or Firm — Wolf, Greenfield & Sacks, P.C.

(57) ABSTRACT

There is provided an information processing apparatus including: a characteristic amount extracting unit extracting a plurality of characteristic amounts, which are information expressing characteristics of a video, from the video; a labeling unit associating the extracted characteristic amounts with a person or a background; a matching degree judging unit judging a degree of matching between the associated characteristic amounts and the characteristic amounts of at least one other video; a comparing unit comparing the plurality of characteristic amounts of one scene in the video from which the characteristic amounts have been extracted and the plurality of characteristic amounts of one scene in the at least one other video; and a relationship inferring unit inferring a relationship between the one scene in the video and the one scene in the at least one other video based on a comparison result of the comparing unit.

16 Claims, 12 Drawing Sheets

FIG.4
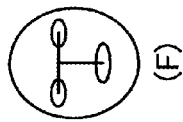
(F)
| [PART] | [COLOR] | [COMPOSITION RATIO] |
|---|---|---|
| HEAD | #000000 | 1 |
| EYES | #220000 | 1 |
| MOUTH | #f8a660 | 0.6 |
| | #f28f6 | 0.4 |
| NOSE | #2a430 | 1 |
| EARS | #8a560 | 1 |
| SKIN | #4a460 | 1 |
(G)
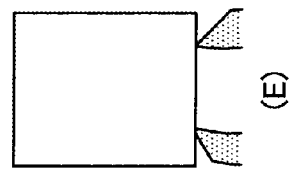
(E)
(B)
(D)
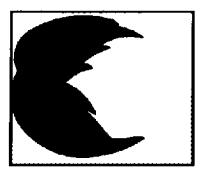
(C)
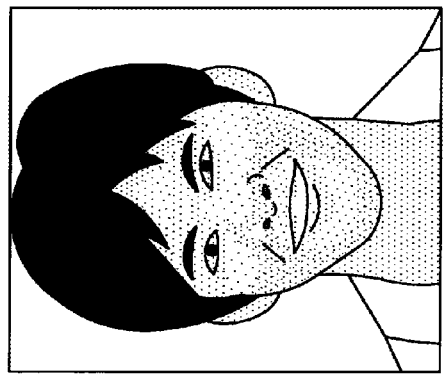
(A)

FIG.11

| CATEGORY NAME | CAHRACTERISTIC AMOUNTS |
|---|---|
| PERSON | FACE, VOICEPRINT |
| ENVIRONMENT | BGM |
| PERFORMANCE | GESTURE, DIALOG |

FIG.12

| SIMILARITY | | | JUDGMENT RESULT (RELATIONSHIP BETWEEN TWO SCENES) |
|---|---|---|---|
| PERSON | ENVIRONMENT | PERFORMANCE | |
| 1 | 1 | 1 | SAME SCENE |
| 0 | 1 | 1 | IMPERSONATION |
| 1 | 0 | 1 | SAME PERSON GIVING SAME PERFORMANCE IN DIFFERENT ENVIRONMENT |
| 1 | 1 | 0 | DUBBED SOUND, DIFFERENT SCENE IN SAME GROUP |
| 0 | 0 | 1 | IMPERSONATION |
| 0 | 1 | 0 | DIFFERENT SCENE IN SAME ENVIRONMENT |
| 1 | 0 | 0 | DIFFERENT SCENE IN WHICH SAME PERSON APPEARS |
| 0 | 0 | 0 | DIFFERENT SCENE |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

In recent years, advances have been made in the speed and capacity of data transfer on networks. One result is that a great amount of video has become easily available to a huge number of users at certain locations on networks. It has also become possible for many users to upload their own videos and share such content with others using video sharing sites. Although it has become easy to share large files such as videos, there is now a vast amount of content available, which makes it difficult for users to find content that matches their preferences and/or to judge whether content that has been uploaded is illegal.

One conceivable solution would be to introduce a system that inputs a video being viewed by the user and/or retail content already owned by the user and outputs other content that is similar. By using this type of system, it would be possible to automatically recommend other content and judge whether uploaded content is illegal, thereby making it unnecessary to manually manage a vast amount of content.

A number of inventions that relate to judging similarity between videos have been disclosed as listed below. For example, the first five of the following references relate to methods of measuring similarity between video images using information obtained from an "image part" of a video.

Japanese Laid-Open Patent Publication No. 2002-203245 (Japanese Patent No. 3711022)
Japanese Laid-Open Patent Publication No. 2006-285907
Japanese Laid-Open Patent Publication No. 2009-147603
Japanese Laid-Open Patent Publication (Translated PCT Application) No. 2006-514451
Japanese Laid-Open Patent Publication No. 2002-32761 (Japanese Patent No. 3636674)
Japanese Laid-Open Patent Publication No. 2009-70278
Japanese Laid-Open Patent Publication No. H11-308581 (Japanese Patent No. 3569441)

The technologies listed above use movement recognition or luminance measuring means to measure similarity between different videos based on characteristic amounts obtained from an "image part" of the videos. However, since similarity is judged only for the image parts, such technologies can fundamentally only be used to carry out judgments of similarity for videos where the content of the image part is substantially the same.

In PCT Application WO2004061711, videos with images that have similar transitions or pictures are recommended to the user, so that the system can be described as a content recommending system that is dedicated to situations where video images are shot with a fixed camera and a distinct pattern is present in the image part, as in video images of sports such as tennis. It is therefore doubtful that such system would be as effective when making recommendations for all types of videos.

In addition, with all of the methods listed above, since no reference is made to the content of the videos, of the methods is suited to recommending videos, such as parodies, where the content is similar but the pictures are different or to discovering illegal videos where the image part is different but only the "audio part" corresponds to non-permitted use of commercial material.

As other methods, Japanese Laid-Open Patent Publication No. 2009-70278 measures similarity between video images using "comments" and Japanese Laid-Open Patent Publication No. 11-308581 (Japanese Patent No. 3569441) measures similarity by searching "text in a program guide" that accompanies programs.

Publication No. 2009-70278 extracts words referred to as "characteristic words" from the content of comments that accompany each video and measures the similarity between videos by comparing the distribution of the sets of obtained characteristic words. The premise here is that a plurality of comments have been assigned to at least a plurality of scenes in all of the videos to be compared. This means that the ability to specify similar videos and the precision when doing so are dependent on the number of comments assigned to the videos being compared. Although it is assumed that there is a high probability of preferred characteristic words being included in comments, since the content of comments is fundamentally freely chosen by users, there is no guarantee that preferred characteristic words will be included. Meanwhile, it is not realistic to implement limitations over the comments that can be made by users.

Publication No. H11-308581 uses program guide information that accompanies a program to measure similarity between a program being viewed by the user and programs that the user can view and that have been assigned a program guide and recommends programs with high similarity to the program being viewed. With this method, videos are recommended based on information that accompanies programs. However, program guides are merely summaries of programs provided by the respective suppliers of videos. Also, in the same way as with Publication No. 2009-70278, since there are no limitations on how such information is written, the number of similar videos that can be discovered by this method is extremely limited, and as a result it is thought difficult to make sufficient recommendations given the great amount of content that is available. Also, since there is fundamentally a one-to-one relationship between program guides and programs, it is not possible with this method to judge similarity between videos in units of scenes.

SUMMARY OF THE INVENTION

The present invention was conceived in view of the problem described above and aims to provide a novel and improved information processing apparatus, an information processing method, and a program that enable wide and flexible searches of multimedia content with similar characteristics.

According to an embodiment of the present invention, there is provided an information processing apparatus including a characteristic amount extracting unit extracting a plurality of characteristic amounts, which are information expressing characteristics of a video, from the video, a labeling unit associating the extracted characteristic amounts with a person or a background, a matching degree judging unit judging a degree of matching between the associated characteristic amounts and the characteristic amounts of at least one other video, a comparing unit comparing the plurality of characteristic amounts of one scene in the video from which the characteristic amounts have been extracted and the plurality of characteristic amounts of one scene in the at least one other video, and a relationship inferring unit inferring a relationship between the one scene in the video and the one scene in the at least one other video based on a comparison result of the comparing unit.

The matching degree judging unit may judge, for the associated characteristic amounts, a degree of matching with the characteristic amounts of the at least one other video that have been recorded in a storage unit. And the comparing unit may be operable when it has been judged using at least one threshold that at least one of the associated characteristic amounts matches at least one of the characteristic amounts of another video item, to compare the plurality of characteristic amounts of one scene in the video and the plurality of characteristic amounts in one scene of the other video.

The characteristic amount extracting unit may extract a plurality of characteristic amounts for each scene in the video.

The characteristic amount extracting unit may be operable when at least one similar characteristic amount is obtained from a plurality of scenes in the video, to assign index information showing that the at least one characteristic amount is similar for the plurality of scenes.

As the characteristic amounts, the characteristic amount extracting unit may recognize a face of a person and detects body movements of the person, and the labeling unit may associate the face and the body movements with the person and gathers together the associated characteristic amounts for each person.

According to an embodiment of the present invention, there is provided an information processing method including steps of extracting a plurality of characteristic amounts, which are information expressing characteristics of a video, from the video, associating the extracted characteristic amounts with a person or a background, judging a degree of matching between the associated characteristic amounts and the characteristic amounts of at least one other video, comparing the plurality of characteristic amounts of one scene in the video from which the characteristic amounts have been extracted and the plurality of characteristic amounts of one scene in the at least one other video, and inferring a relationship between the one scene in the video and the one scene in the at least one other video based on a comparison result of the comparing unit.

According to an embodiment of the present invention, there is provided a program causing a computer to carry out steps of extracting a plurality of characteristic amounts, which are information expressing characteristics of a video, from the video, associating the extracted characteristic amounts with a person or a background, judging a degree of matching between the associated characteristic amounts and the characteristic amounts of at least one other video, comparing the plurality of characteristic amounts of one scene in the video from which the characteristic amounts have been extracted and the plurality of characteristic amounts of one scene in the at least one other video, and inferring a relationship between the one scene in the video and the one scene in the at least one other video based on a comparison result of the comparing unit.

According to the embodiments of the present invention described above, it is possible to carry out wide and flexible searches of multimedia content with similar characteristics.

BRIEF DESCRIPTION OF THE DRAWINGS

FIGS. 4A to 4G are diagrams useful in showing an example of high-frequency components that are a characteristic of a detected face and a color composition of the face;

FIG. 11 is a table showing characteristic amounts that are classified into three categories; and FIG. 12 is a table showing combinations of degrees of similarity and relationships between scenes.

DETAILED DESCRIPTION OF THE EMBODIMENTS

Figure 1:
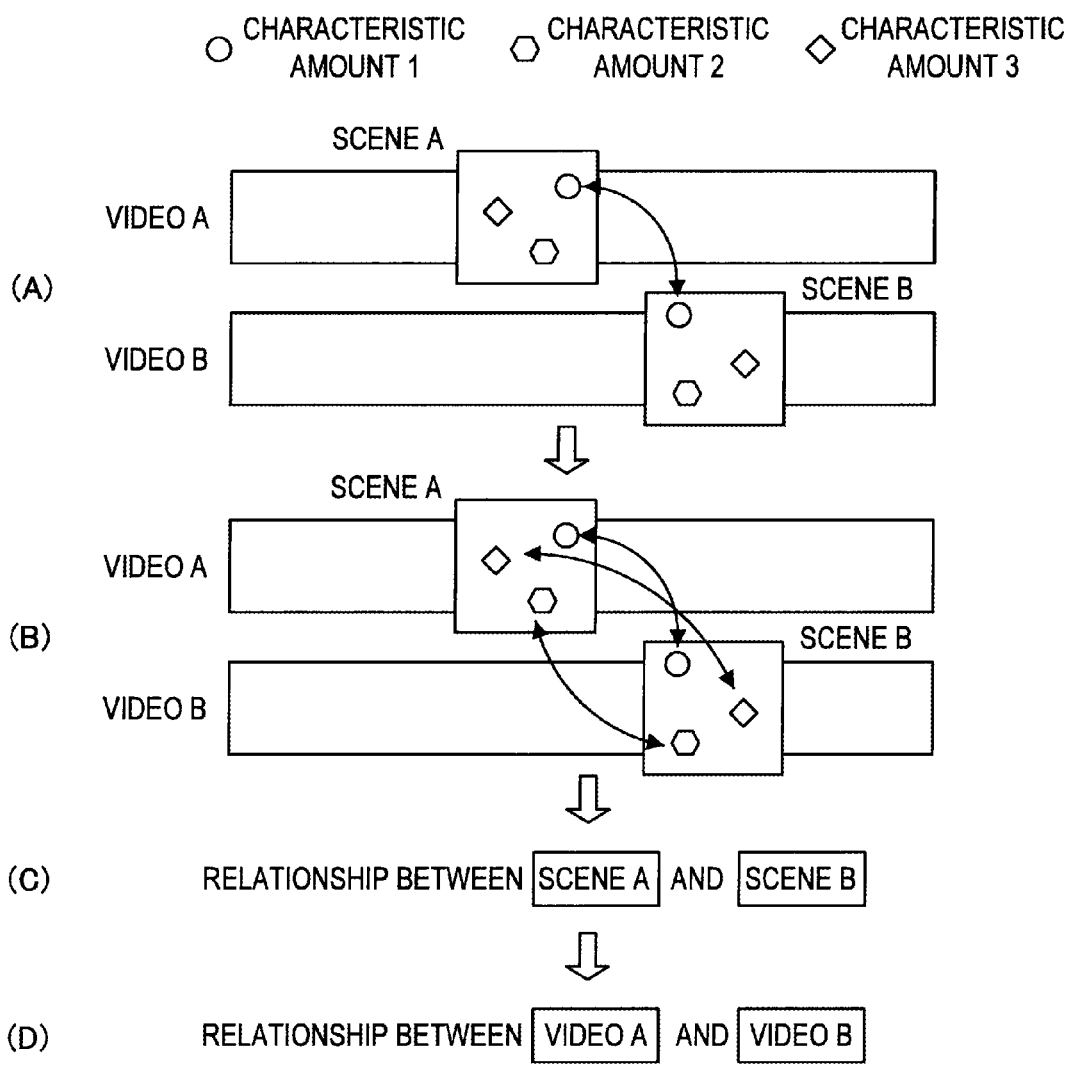
FIGS. 1A to 1D are diagrams useful in showing the overall processing of an information processing apparatus 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview of Processing by Information Processing Apparatus 100
2. Information Processing System According to the Present Embodiment
3. Flow of Processes
4. Types of Characteristic Amounts Extracted from a Video and Method of Extraction
5. Labeling of Characteristic Amounts
6. Associating Speaker and Spoken Content
7. Storage of Characteristic Amounts and Method of Judging Similarity
8. Method of Inferring Relationship between Videos
9. Method of Judging Similarity for Characteristic Amounts
10. Effects of the Present Embodiment 1. Overview of Processing by Information Processing Apparatus 100

The present embodiment provides a method that extracts various characteristic amounts from video, audio, and the like in videos being processed and, based on such characteristic amounts, finds and presents videos and scenes with similar characteristics using a more flexible method than in the background art. By doing so, as examples, it is possible to associate an original and a parody version together and to recommend a live-action video version of an animated video that is being viewed by the user.

Also, in the present embodiment, characteristic amounts obtained from videos can be aggregated for each character and registered in a database 106. After this, by using the database 106, it is possible to distinguish characters in unknown videos and to associate videos that use the same characters.

In the present embodiment, as examples of the characteristic amounts, information on the face of a character (such as high-frequency components and skin color composition), audio information (such as a voiceprint of the character and BGM), subtitle information, and gestures (movement change patterns on a time axis) are extracted from video content and used.

The present embodiment mainly carries out the processing described below.
1. The characteristic amounts described above are extracted from every scene in a video and such characteristic amounts are judged and labeled as belonging to a character or to the background.
2. After the processing in (1.), if the labeled characteristic amounts are judged to match or be similar to the characteristic amounts of another video already registered in the database 106, the similarity between the scenes that caused such judgment is then determined for each characteristic amount.
3. In accordance with the result of the judgments of similarity in (2.), an overall similarity for the two videos is calculated and the relationship between the two videos is inferred.

The flow of the processing in the present embodiment will now be described with reference to FIGS. 1A to 1D. FIGS. 1A to 1D are diagrams useful in explaining the overall processing of an information processing apparatus 100 according to the present embodiment.

In the present embodiment, first characteristic amounts that are decided in advance are extracted from a video being processed. For example, as shown in FIG. 1A, characteristic amounts 1 to 3 are extracted from video A. The extracted characteristic amounts are individually judged and labeled as belonging to a character or to the background.

It is then verified whether the labeled characteristic amounts are similar to characteristic amounts that belong to another video present in the database 106. As one example, as shown in FIG. 1A, it is verified whether the characteristic amount 1 of video A is similar to the characteristic amount 1 of video B.

If characteristic amounts that match or are similar are present in the database 106, the similarity for all of the characteristic amounts is then judged for the scenes that caused such judgment of similarity. For example, as shown in FIG. 1B, similarity is judged for the characteristic amounts 2 and 3 aside from the characteristic amount 1 between scene A of video A and scene B of video B. As a result of judging the similarity, a relationship between scene A and scene B is obtained (FIG. 1C).

After this, based on the judgment result for similarity for the respective characteristic amounts, an overall judgment of similarity is made for the two videos. At the same time, a relationship between the two videos is inferred with reference to the similarity for each characteristic amount (see FIG. 1D).

An information processing system according to the present embodiment, the flow of the respective processes, the types of characteristic amounts extracted from the videos and the method of extraction, the method of judging similarity between the characteristic amounts, and the method of inferring a relationship between videos will now be described.

2. Information Processing System According to the Present Embodiment

Figure 2:
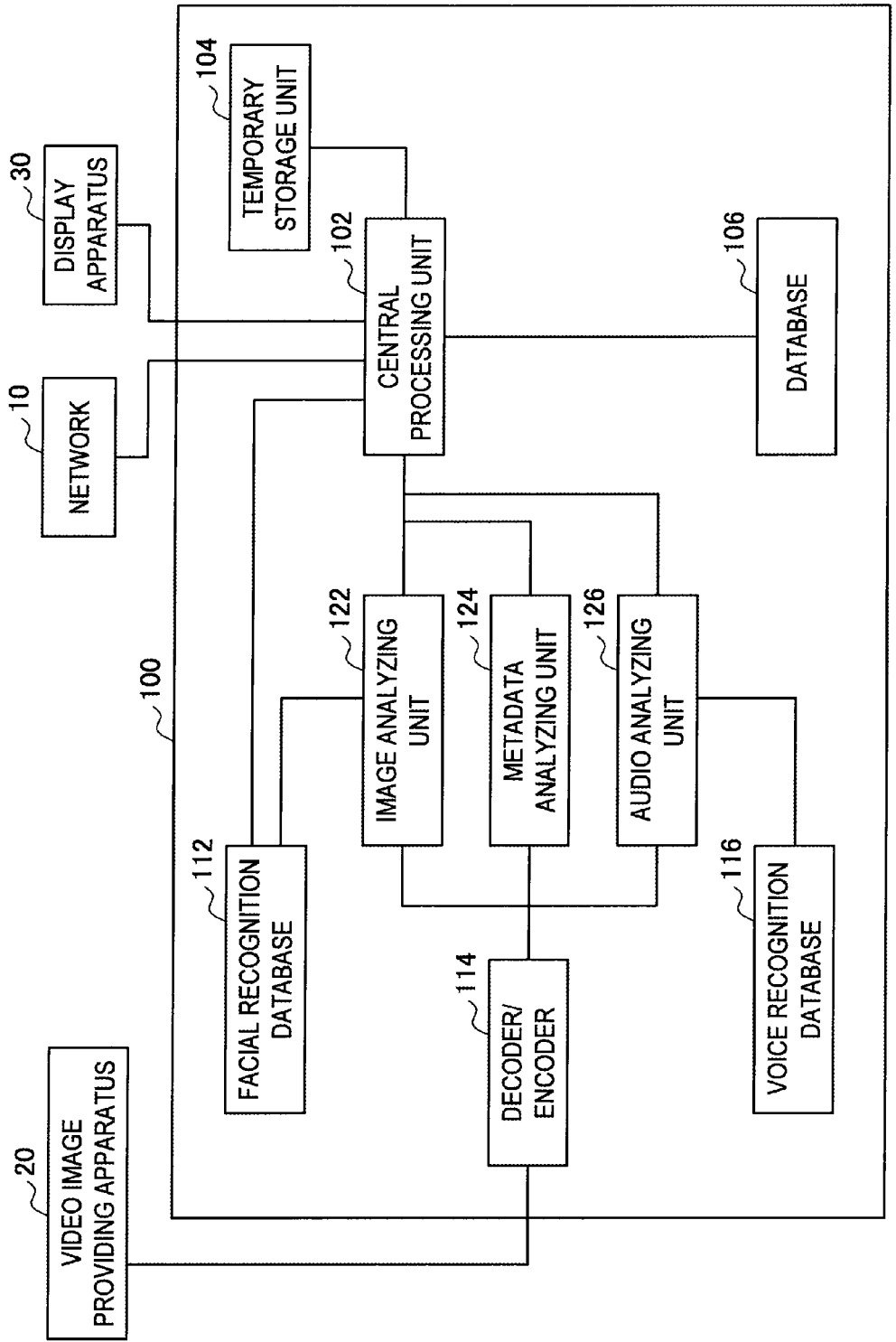
FIG. 2 is a block diagram showing an information processing system including the information processing apparatus 100 according to the present embodiment.

An information processing system that includes the information processing apparatus 100 according to the present embodiment is shown in FIG. 2. FIG. 2 is a block diagram showing the information processing system including the information processing apparatus 100 according to the present embodiment.

The information processing apparatus 100 according to the present embodiment includes a central processing unit 102, a temporary storage unit 104, a database (storage apparatus) 106, a facial recognition database 112, a decoder/encoder 114, a voice recognition database 116, an image analyzing unit 122, a metadata analyzing unit 124, an audio analyzing unit 126, and the like. The information processing apparatus 100 may be used having been incorporated into a household video recording appliance.

The information processing apparatus 100 receives videos from a video sharing site and/or a video image providing apparatus 20, such as a household video recording appliance or a television broadcasting station, decodes or encodes a video stream as necessary, and then divides the video stream into an image part, an audio part, and a metadata part.

The image analyzing unit 122, the audio analyzing unit 126, and the metadata analyzing unit 124 receive the divided stream as appropriate and extract characteristic amounts of the video.

The central processing unit 102 carries out a process that receives the extracted characteristic amounts and accumulates the characteristic amounts in the temporary storage unit 104 and/or stores the characteristic amounts in the database 106. The central processing unit 102 outputs, via a display apparatus 30, statistical information on the characteristic amounts accumulated in the temporary storage unit 104 and/or information obtained as a result of carrying out the process that stores the characteristic amounts in the database 106. The central processing unit 102 also has an environment that is capable of acquiring information relating to characteristic amounts as necessary from a network 10.

3. Flow of Processes

Figure 3:
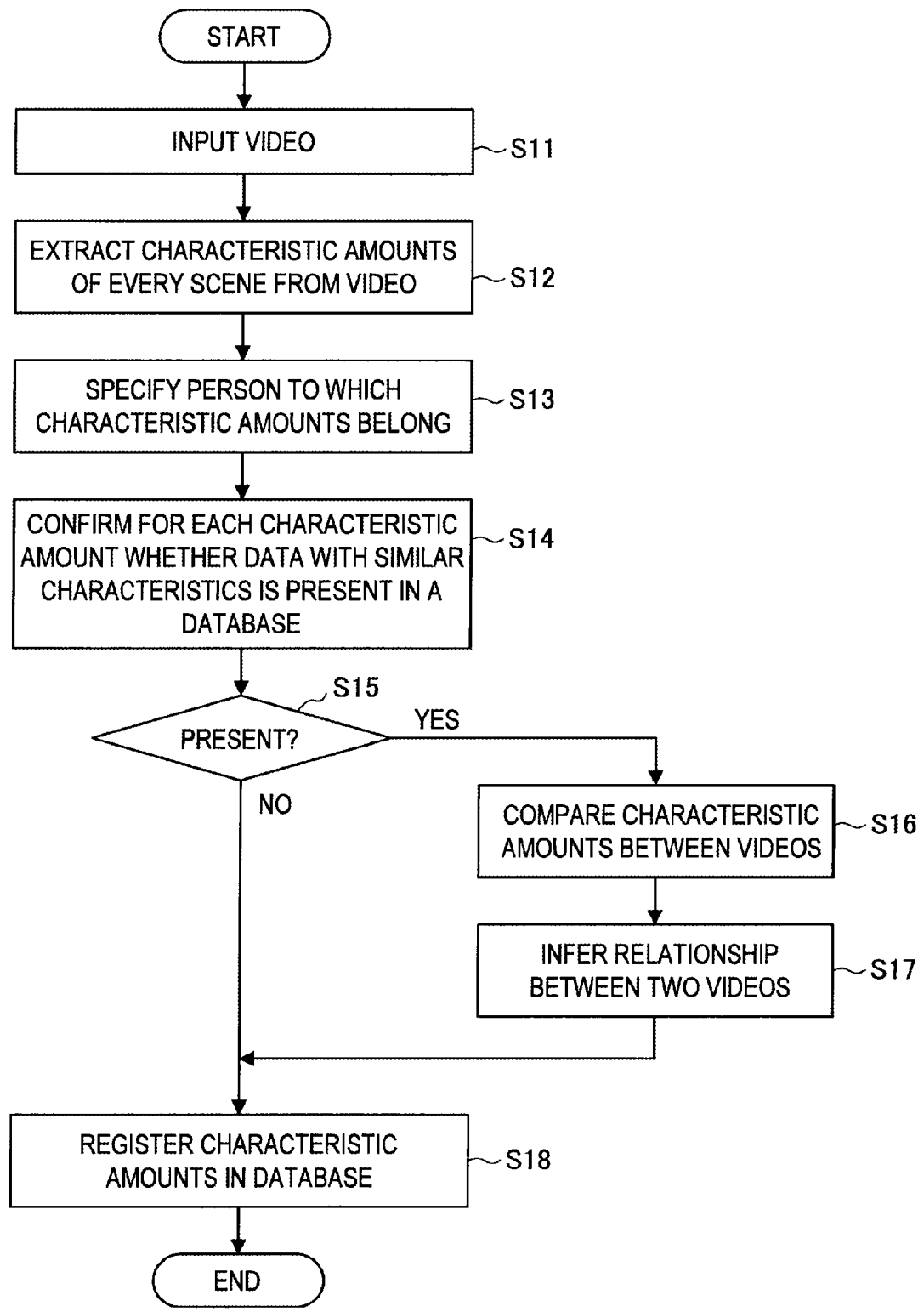
FIG. 3 is a flowchart showing a processing operation of the information processing apparatus 100 according to the present embodiment.

The processing flow in the present embodiment is shown in FIG. 3. FIG. 3 is a flowchart showing processing operations of the information processing apparatus 100 according to the present embodiment.

Figure 9:
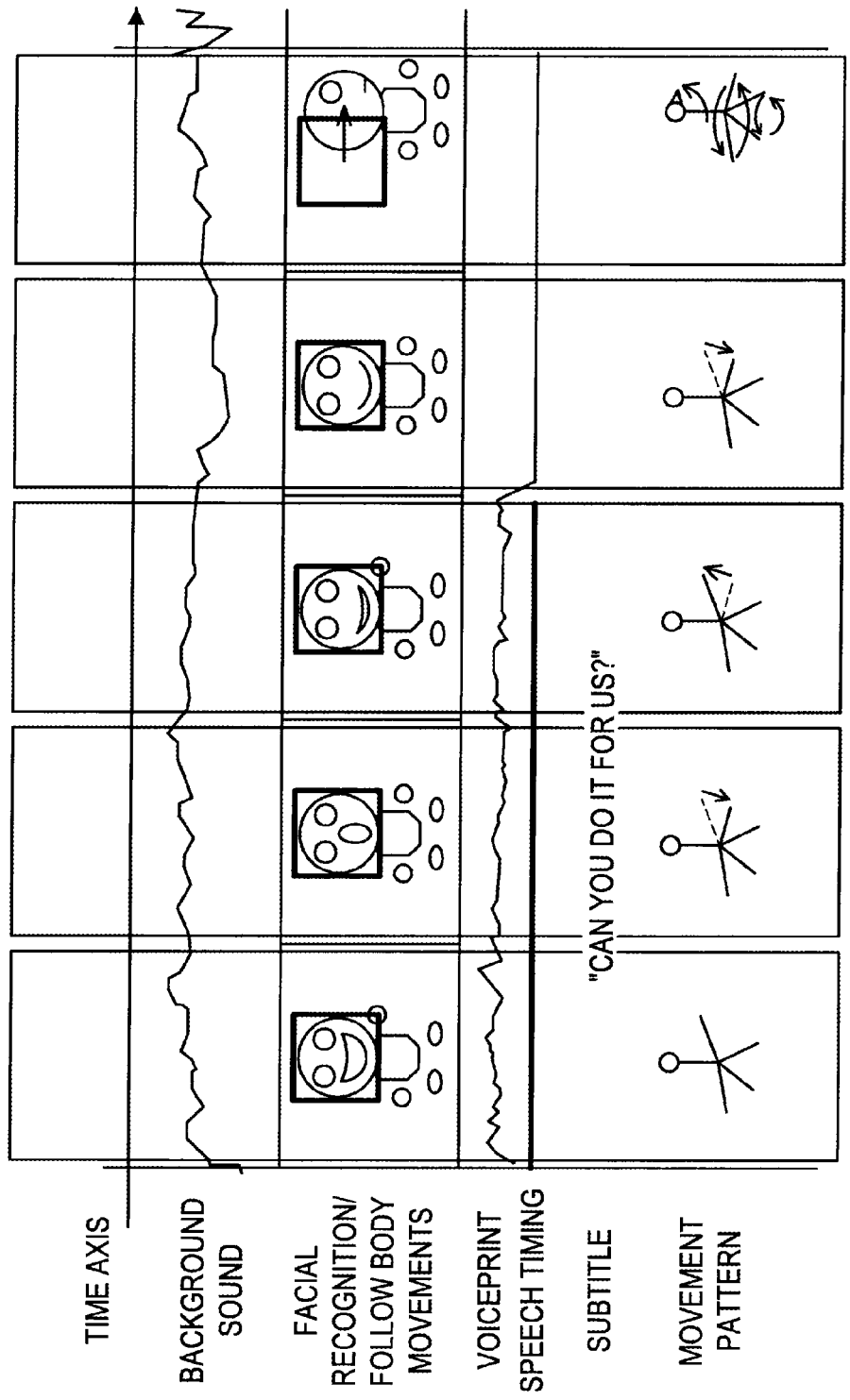
FIG. 9 is a diagram useful in showing the relationship between a time line of a video and extracted characteristic amounts.

First, a video is inputted (step S11). Information ("characteristic amounts") expressing characteristics of the video in every scene is then extracted from the inputted video (step S12). The extraction of characteristic amounts is carried out by the image analyzing unit 122, the audio analyzing unit 126, and the metadata analyzing unit 124 shown in FIG. 2. The image analyzing unit 122, the audio analyzing unit 126, and the metadata analyzing unit 124 are one example of a "characteristic amount extracting unit" for the present invention. FIG. 9 shows the relationship between a timeline of a video and characteristic amounts that are extracted.

The image analyzing unit 122 has a typical facial recognition function and body movement recognition function, and mainly extracts high-frequency components of a face, the color and distribution of the face, movements, a person specified using facial recognition, and the color and distribution of the body as necessary. The facial recognition database 112 has a dictionary that is generated in advance, and is used when specifying people using facial recognition.

The audio analyzing unit 126 includes an audio information (frequency characteristic) extracting function and extracts mainly a voiceprint (frequency distribution) of a person, volume, and sections where the frequency distribution sharply changes from the audio information of a video. The audio information (frequency characteristic) extracting function is capable of using the technology disclosed in the specification of Japanese Laid-Open Patent Publication No. 2009-278180, for example. Also, if the audio analyzing unit 126 has a speech recognition (voice recognition) function, a spoken content is extracted as a characteristic amount. The voice recognition database 116 has a dictionary that is generated in advance, and is used to specify a person via extraction of voice information.

The metadata analyzing unit 124 extracts mainly subtitle information from metadata that accompanies a video. If the title of the video is included in the obtained metadata, the title is also extracted as necessary as a characteristic amount. If the names of characters are included in the obtained metadata, the metadata analyzing unit 124 refers as necessary via the central processing unit 102 to facial images on the network 10 based on the names of the characters and registers composition information of the faces of the people in question in the facial recognition database 112.

Next, a labeling unit of the central processing unit 102 specifies to which person the extracted characteristic amounts belong or whether the characteristic amounts do not belong to any person (step S13). The method of labeling the characteristic amounts in this process will be described later.

After this, a match judging unit of the central processing unit 102 confirms whether data with similar values to the characteristic amounts of each scene that have been labeled is present in the database 106 (step S14). Here, the data in the database 106 is characteristic amounts of other videos that have been registered in the database 106 by previously carrying out the same process.

If, as a result of verification, data with similar characteristic amounts has been found in the database 106 (step S15), a comparing unit of the central processing unit 102 compares the characteristic amounts of the two videos that have such characteristic amounts (step S16). Such comparing is carried out for all of the characteristic amounts included in the scenes judged to have similar characteristic amounts.

From the result of the comparison, a relationship inferring unit of the central processing unit 102 infers a relationship between the two videos based on the similarity of the respective characteristic amounts (step S17).

Meanwhile, if there is no data that is similar to the characteristic amounts in the database 106, the comparison process and the relationship inferring process for a video are not carried out.

Lastly, the characteristic amounts are newly registered in the database 106 to complete the processing (step S18). Additionally, if data that is similar to the characteristic amounts to be registered has been found in the database 106, information on the relationship between the scenes and videos to which the two characteristic amounts belong is added to the characteristic amounts and also to the registered content of the characteristic amounts of the similar data.

As supplementary explanation, if, in step S12, similar characteristic amounts are obtained for a plurality of scenes in a video when extracting the characteristic amounts from the video, by assigning index information showing that such amounts are similar in advance, it is possible to reduce the number of searches carried out when data in the database 106 is compared with newly extracted characteristic amounts, and as a result, it is possible to reduce the processing time.

4. Types of Characteristic Amounts Extracted from a Video and Method of Extraction The types of characteristic amounts extracted from a video and the method of extraction are described below.

Image Analyzing Unit 122

FIGS. 4A to 4F are diagrams useful in explaining one example of high-frequency components that are characteristics of a detected face and the color composition of the face. FIG. 4A shows one example of a face in a video.

Figure 5:
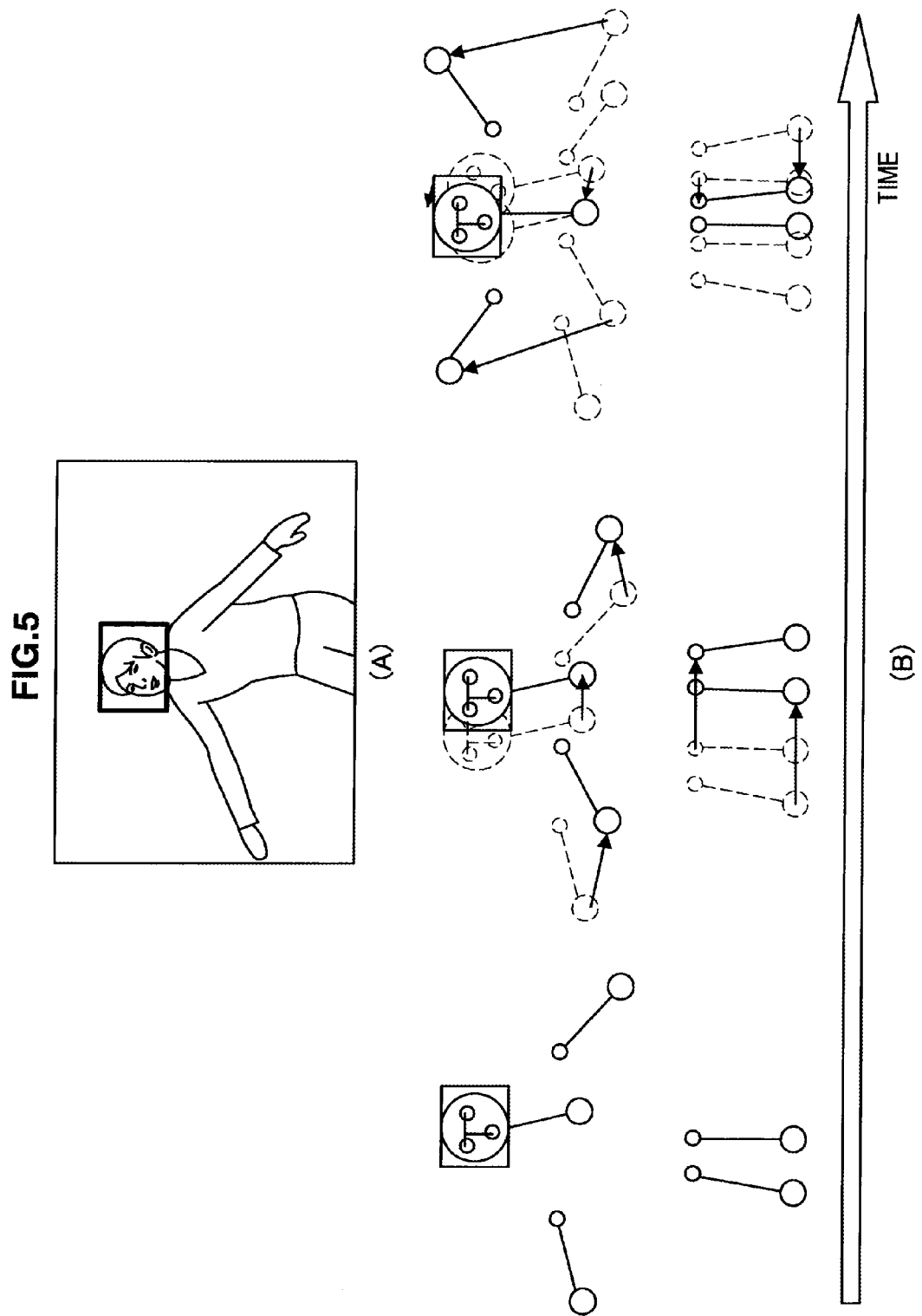
FIGS. 5A and 5B are diagrams useful in showing an example of detection of a gesture/movement pattern.

As shown in FIGS. 4B and 4F, as a facial recognition function, the image analyzing unit 122 extracts contour (high-frequency) components by carrying out a Fourier transform. As shown in FIGS. 4C to 4E and 4G, the image analyzing unit 122 also calculates composition ratios of colors of the detected face as ratios relative to the area of the face. After this, it is possible to carry out a facial recognition process using the contours of the face and/or information on the color composition such as that in FIGS. 4A to 4G obtained by the characteristic amount extracting process. In addition, as a body movement recognition function, the image analyzing unit 122 detects body movements from the video. FIGS. 5A and 5B are diagrams useful in showing one example of detection of gesture/movement patterns. The image analyzing unit 122 then associates the face and body movements from the results of the facial recognition and the body movement detection and registers movement changes of the character in a series of scenes.

Audio Analyzing Unit 126

Figure 6:
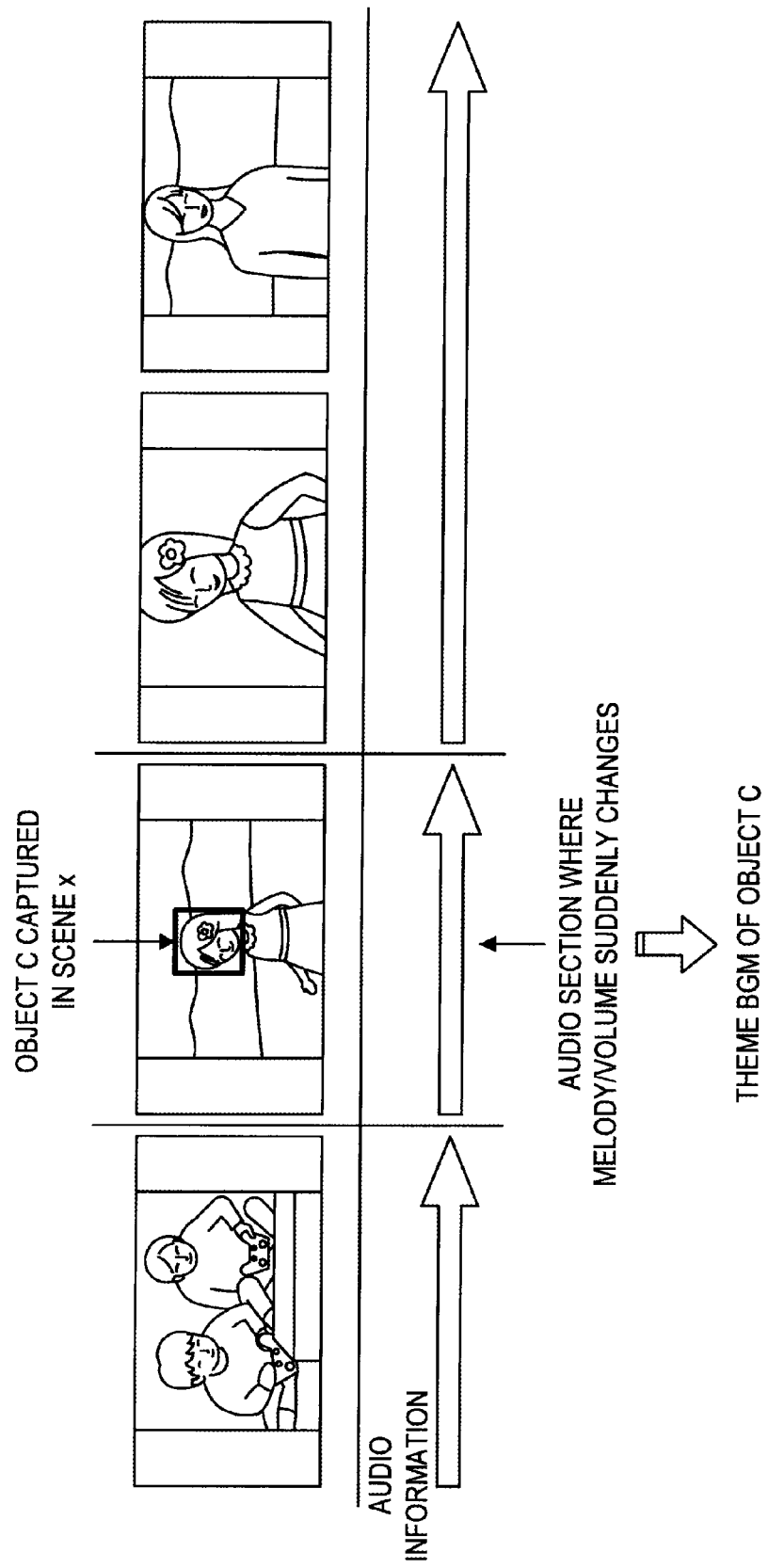
FIG. 6 is a diagram showing detection of a theme song (theme BGM) of a video.

The audio analyzing unit 126 detects a voiceprint from the video. Based on lip movements of the detected face, the audio analyzing unit 126 also separates voice information of a person from background sound to acquire the voice information. By carrying out speech recognition, the audio analyzing unit 126 also extracts the spoken content (dialog) of the person. Also, as shown in FIG. 6, the audio analyzing unit 126 detects BGM (BackGround Music) from the video. FIG. 6 is a diagram useful in showing extraction of a theme song (theme BGM) of a video. The audio analyzing unit 126 refers for example to sudden changes in people appearing in scenes, volume, and/or high-frequency components to separate background sound.

Metadata Analyzing Unit 124

If subtitles are included in the metadata of a video, the metadata analyzing unit 124 extracts the subtitles from the video.

5. Labeling of Characteristic Amounts

Figure 7:
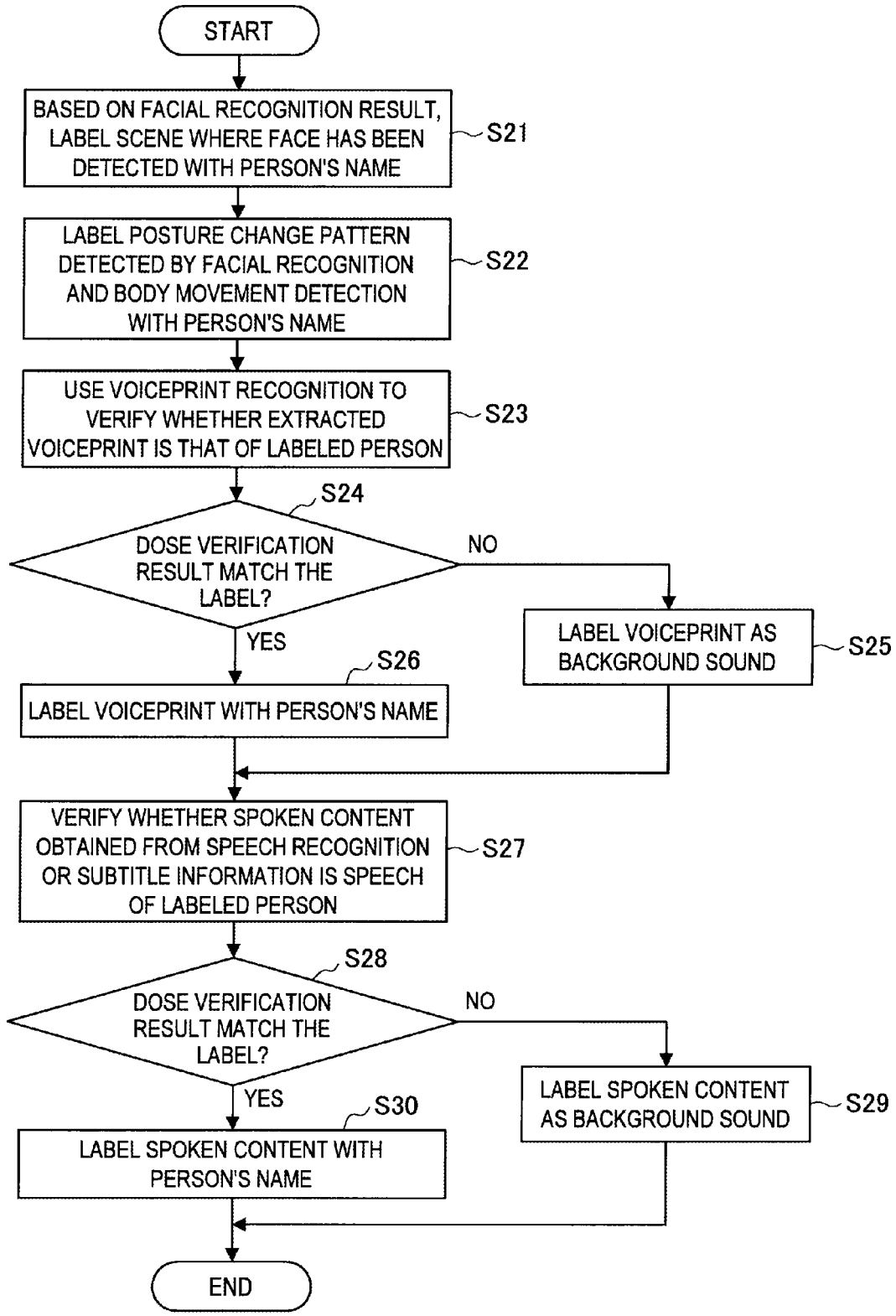
FIG. 7 is a flowchart showing a labeling process for characteristic amounts.

Next, a labeling process for characteristic amounts will be described. FIG. 7 is a flowchart showing the labeling process for characteristic amounts.

First, for scenes that have been subjected to facial recognition by the image analyzing unit 122, each scene in which a face has been detected is labeled with the name of the detected person (step S21). The label names do not need to be the proper names of the people, and it is possible to use any information that serves as unique identifiers indicating specific people.

Next, a movement change pattern of a person obtained by carrying out detection of body movements using the detected face is labeled with the same name as the face in question (step S22).

In addition, for the audio information of a scene in which the face described above and the body movements have been detected, it is verified whether the voiceprint obtained by the audio analyzing unit 126 is the voiceprint of the person whose name is the label assigned to the face and/or body movements in the scene (step S23). Here, as one example, the method disclosed in Japanese Laid-Open Patent Publication No. 2009-278180 is used to recognize the voiceprint.

If, as a result of verification, the voiceprint obtained for a scene matches the person indicated by the label (step S24), the label is assigned to the voiceprint (step S26). Meanwhile, if the voiceprint has been recognized as that of another person (step S24), the voiceprint is assigned a label as background sound and is excluded from subsequent processing (step S25). By doing so, it is possible to reduce the amount of processing in the subsequent similarity judging process.

Note that by using the voiceprint recognition disclosed in Japanese Laid-Open Patent Publication No. 2009-278180, it is possible to specify a person from a voice using only audio information such as that described above. However, in the present embodiment, emphasis is placed on gathering characteristic amounts for a video based on characters. For this reason, information that includes only audio but no images is judged to be insufficient for extracting characteristics of a person and accordingly such information is not used.

Also, if BGM has been detected as in FIG. 6, such BGM can be labeled as a characteristic amount in the same way as a voiceprint and used when judging similarity.

After this, in the same way as a voiceprint, for a scene, it is verified whether the spoken content obtained from speech recognition by the audio analyzing unit 126 or from subtitle information produced by the metadata analyzing unit 124 is speech by the person whose name has been used as a label (step S27). If the result of speech recognition by the audio analyzing unit 126 is used as the spoken content, since it is possible to simultaneously extract a voiceprint by carrying out voiceprint recognition, if a person can be specified from the voiceprint, it will be possible to easily specify the person to which such spoken content belongs.

Meanwhile, regarding spoken content obtained from subtitle information, by comparing speech timing that accompanies the subtitle information against the time in a scene when lip movements have been detected using facial recognition by the image analyzing unit 122, it is possible to specify the person to which the spoken content belongs. A method of associating a speaker and a spoken content will be described later.

If, as a result of verification, the spoken content has been recognized as speech of the person in question (step S28), the present label is assigned to the spoken content (step S30). Conversely, if the spoken content has been recognized as speech of another person, the spoken content is labeled as background sound, and subsequent processing is not carried out (step S29). This completes the labeling process for characteristic amounts.

6. Associating Speaker and Spoken Content

Figure 8:
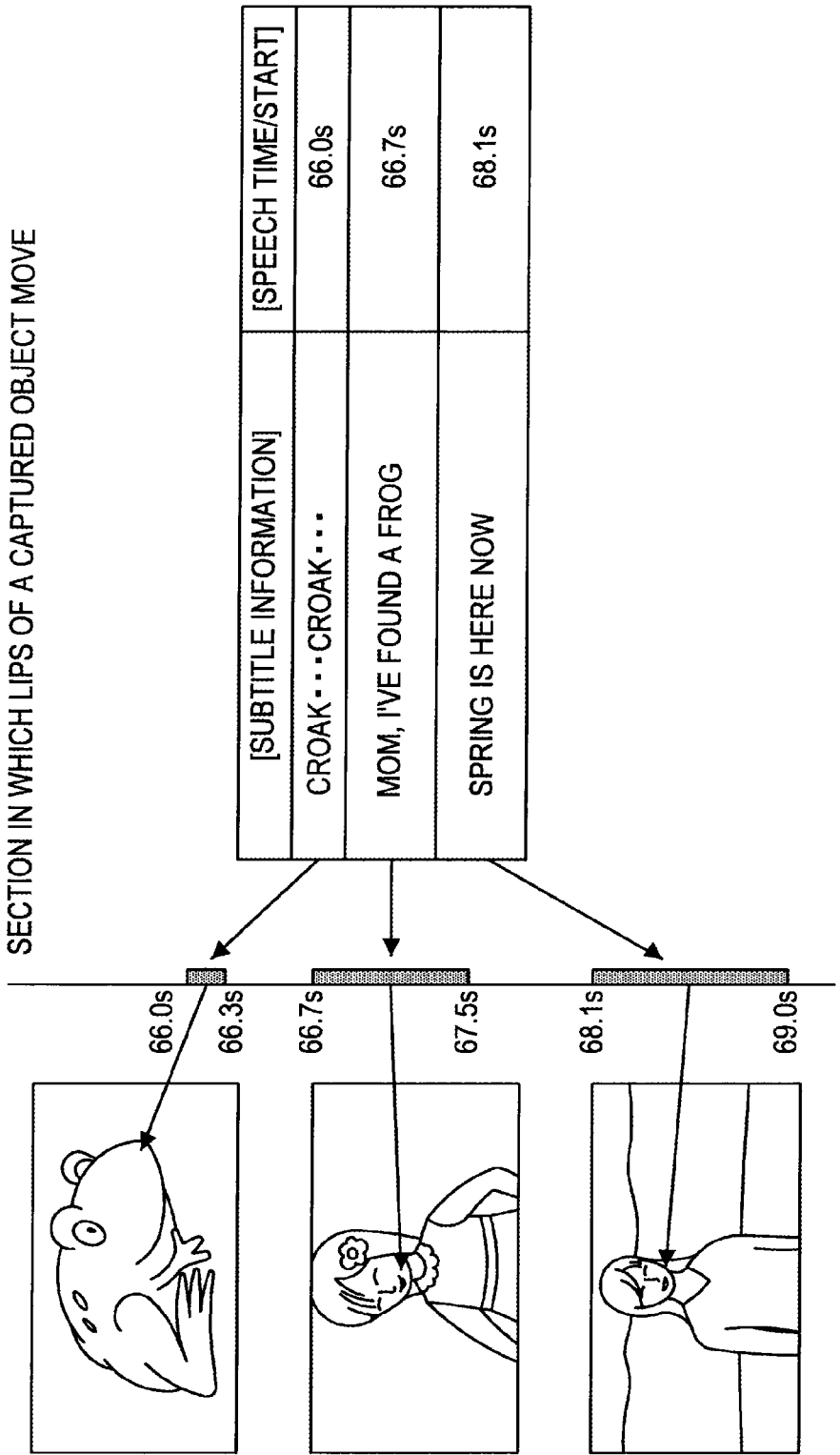
FIG. 8 is a diagram useful in showing how speakers and spoken contents are associated.

The associating of a speaker and a spoken content will now be described with reference to FIG. 8. FIG. 8 is a diagram useful in showing the associating of a speaker and a spoken content.

First, characters in each scene are detected and specified by the facial recognition function of the image analyzing unit 122. Next, scenes including lip movements are also detected and marked out of such scenes.

Meanwhile, spoken content from subtitle information obtained by the metadata analyzing unit 124 is assigned to each scene based on the accompanying timing information. Here, scenes in which lip movements have been detected by the image analyzing unit 122 and the assigned subtitle information are placed together on the time axis. By doing so, it is possible to specify which spoken content was spoken by which person.

7. Storage of Characteristic Amounts and Method of Judging Similarity

The following data is stored as the characteristic amounts.
(Storage of Characteristic Amounts in Temporary Storage Unit 104)
    Characteristic Amount Types
    Values of Characteristic Amounts
    Labels
    Scene Start Time
    Scene End Time
    Index Numbers (Characteristic Amount Storing Database 106)
    Characteristic Amount Types
    Values of Characteristic Amounts
    Labels
    Scene Start Time
    Scene End Time
    ID number of Video
(Video/Scene Relationship Storing Database 106)
    ID number of Video 1
    Scene Start Time of Video 1
    Scene End Time of Video 1
    ID number of Video 2
    Scene Start Time of Video 2
    Scene End Time of Video 2
    Video/Scene Flag
    Relationship Type If data where a characteristic amount matches or data that is judged to be similar from a result of using a threshold is present in the database 106, the similarity of every characteristic amount is then measured between the scenes in which the matching characteristic amount is present. Based on such measurements, the relationship between two videos or scenes is decided.

Next, the calculation of similarity will be described.
(Similarity for Video Images)

Face . . . similarity for faces of characters is determined between scenes from the contours and/or color composition ratio of faces that have been detected.

Movement . . . similarity for movements of characters is determined between scenes from changes in posture on a time axis.
(Similarity for Audio)

Voiceprint . . . similarity for voices of characters is determined between scenes from a frequency distribution of audio.

BGM . . . similarity for BGM of characters is determined between scenes from audio information that plays for a certain period.
(Similarity for Content)

Dialog . . . similarity for dialog of characters is determined between scenes from the voiceprint and subtitles and/or spoken content.

8. Method of Inferring Relationship Between Videos

By comparing the characteristic amounts described above to find the degree of similarity of various characteristics of two videos, it is possible to classify relationships as shown below.

Characteristic Amounts to be Compared and Similarity
(1) A face is the same. Or is similar.
(2) A movement pattern is the same. Or is similar.
(3) A voiceprint is the same. Or is similar.
(4) Dialog is the same. Or is similar.

Evaluation may be carried out as described below to see whether the degree of similarity between two videos or scenes is zero or below for such characteristic amounts (that is, such amounts are not similar), or whether the degree of similarity is larger than a threshold set in advance.

Degree of Similarity and Evaluation
(1) If similarity is zero or below→possibly a different person
(2) If similarity is equal to or above a threshold→possibly the same person
(3) If similarity is below the threshold→possibly a different person doing an impression or some kind of a modification The relationship between two items or scenes is judged in view of the overall similarity for all of the characteristics in each scene.

Result of Similarity and Judgment of Relationship Between Content
(1) If the degree of similarity is above a threshold for every characteristic amount given above→the two videos have the same content
(2) If the degree of similarity is above a threshold for the face and voiceprint of at least a certain number of people→the two videos are part of a series
(3) If the degree of similarity is above a threshold for the face and voiceprint of at least one person but less than the certain number of people→the two videos are different programs with the same characters.
(4) If there is a scene where the degree of similarity for the face and voiceprint is below a threshold but the degree of similarity of a movement pattern and/or dialog is above a threshold→the video is a parody including another person doing an impression
(5) If the degree of similarity is below a threshold for every characteristic amount→the videos are unrelated.

By finding the total of the number of scenes where high similarity has been calculated, the judgment described above makes it possible to evaluate whether a relationship is established for two entire videos or is established for only specified scenes.

When inferring a relationship between videos, although it would be possible to carry out processing for each scene where the same face (person) is shown, it is preferable to carry out facial recognition and also associated body movement detection and subject only scenes where the same characters appear to processing.

By doing so, it is possible to label (index) the respective characteristic amounts for each character in each video. As a result, it is possible to aggregate the characteristic amounts for a person and to decide the importance of such information and/or sort through such information in advance. This makes it possible to increase the processing speed.

Meanwhile, if the characteristic amounts of a face are given priority, it is possible to classify two scenes as belonging to the same series or as being different videos in which the same person appears. However, if the characteristic amounts of a face are given priority, it may not be possible to spot the relationship between videos where characteristic amounts aside from the face are the same but the faces are different. For example, if the dialog or voice is the same but the face is different, it may not be possible to determine similarity by carrying out processing that gives priority to the characteristic amounts of a face. However, if the dialog or voice is the same but the face is different, it can be assumed that there is an "impersonation"-type relationship composed of what is actually a different person doing an imitation or the like. For this reason, when inferring a relationship between videos, it is not considered preferable to carry out processing on a scene-by-scene basis for scenes where the result of facial recognition (that is, a label) is the same.

9. Method of Judging Similarity for Characteristic Amounts

Figure 10:
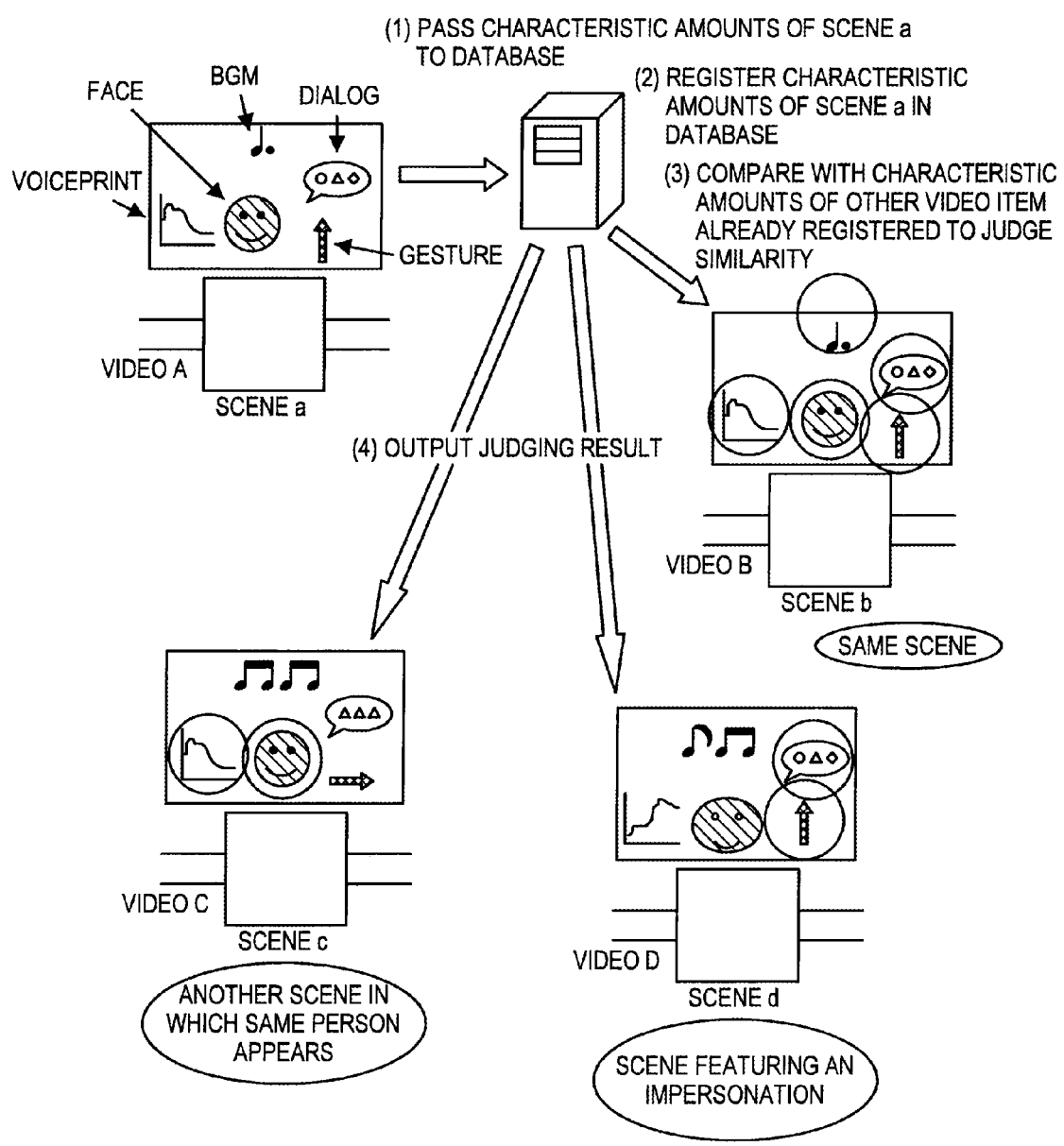
FIG. 10 is a diagram useful in showing a similarity judging method for characteristic amounts.

The method of judging similarity for the characteristic amounts will now be described with reference to a flow shown in FIG. 10. FIG. 10 is a diagram useful in showing the method of judging similarity for the characteristic amounts.

First, in (1) in FIG. 10, characteristic amounts in a scene are extracted from scene a in video A that is being processed and passed to the database 106. Here, it is assumed that the scenes to be processed are scenes in which faces have been detected by a typical facial detection method.

Face information of a person, gestures (a movement pattern within a scene), a voiceprint of the face in question, BGM in the scene (background sound in the scene produced by excluding the voice of the person in question), and dialog (subtitle information) can be given as five examples of the characteristic amounts extracted from each scene. Note that the characteristic amounts are not necessarily limited to these five examples and it is also possible to use other characteristic amounts.

The extracted characteristic amounts are registered in the database 106 by the present system ((2) in FIG. 10). At the same time, a degree of similarity is calculated between the extracted characteristic amounts and characteristic amounts extracted from other videos (scenes) that are already registered in the database 106 ((3) in FIG. 10).

The standards and calculation formulas for judging similarity for the respective characteristic amounts are given below. In the following description, two scenes for which similarity is being judged are referred to as "A" and "B". The degrees of similarity calculated by the calculation formula take a value in a range of zero to one, with higher values in the range of zero to one indicating greater similarity.

(Judgment of Similarity for Faces)

A judgment of similarity for faces compares the contours of faces as well as color information.

When faces are compared between scenes, resizing is first carried out to make both faces the same size. As one example, if the sizes of the faces detected in the respective scenes A and B are expressed as $F_s(A)$, $F_s(B)$, the resizing ratio r is expressed by Equation 1 below.

$$r = F_s(B)/F_s(A) \quad \text{(Equation 1)}$$

Here, it is assumed that resizing is carried out with the same ratio in the vertical and horizontal axes to prevent deformation of the faces.

After this, the degree of similarity is calculated for the contours and the colors of both faces.

Here, a two-dimensional plane is expressed by x and y. Two-dimensional contour information of faces in the scenes A and B is expressed as $F_l(A(x,y))$ and $F_l(B(x,y))$ and two-dimensional color information is expressed as $F_c(A(x,y))$ and $F_c(B(x,y))$. In addition, if a loading of the comparison result is set at u, the similarity RF (A, B) for faces in the scenes A and B is expressed as shown in Equation 2 below.

$$RF(A,B) = u\Sigma_{x,y}[1-\{F_l(A(x,y))-F_l(B(x,y))\}]/(L\_MAX \times F_s(B)) + (1-u)\Sigma_{x,y}[1-\{F_c(A(x,y))-F_c(B(x,y))\}]/(C\_MAX \times F_s(B)) \quad \text{Equation 2.}$$

Here, L_MAX and C_MAX express the respective maximum values for the contour information and the color information.

Judgment of Similarity for Voiceprints

Judgment of similarity for voiceprints is carried out by comparing the frequency distributions of voices.

If the frequency is expressed as f and the voiceprints, that is, the frequency distributions of people in scenes A and B are expressed as $V_{FA}(f)$ and $V_{FB}(f)$, the similarity $R_V(A,B)$ for voiceprints in the scenes A and B is expressed as shown in Equation 3 below.

$$R_V(A,B) = \Sigma_f\{V_{FA}(f) - V_{FB}(f)\}/(F\_MAX \times D\_MAX) \quad \text{(Equation 3)}$$

Here, F_MAX and D_MAX respectively express a frequency maximum value and a value for normalizing sound.

Judgment of Similarity for Gestures

A judgment of similarity for gestures detects five endpoint positions (i.e., the head and both hands and feet) of a body using an existing body movement detection method and measures and compares the movement loci of the respective endpoints within scenes.

If time is expressed as t, an endpoint number is expressed as n, and the position of an endpoint is expressed as p(t,n), a movement vector of endpoint $n_0$ from a time $t_0$ to another time $t_1$ is expressed as $(p(t_1,n_0)-p(t_0,n_0))$.

Here, the default position for the end points uses a state where the face is facing to the front and a midline for both eyes is perpendicular to the horizontal as the standard. This means that it is possible to estimate the posture of a person based on the inclination of the detected face to the horizontal and the vertical and to calculate endpoint positions in three dimensions.

Next, similarity is calculated for the endpoint movement vectors calculated for the scenes A and B. If the movement vectors for the endpoint n in scenes A and B at time t are expressed as $v_A(t,n)$ and $v_B(t,n)$, the similarity $R_M(A,B)$ for gestures in the scenes A and B is expressed as shown in Equation 4 below.

$$RM(A,B)=1-\Sigma_{t,n}|\{(v_A(t,n)-v_B(t,n))/(|v_A(t,n)||v_B(t,n)|)\}|/(DIM \times T\_MAX \times N\_MAX) \quad \text{(Equation 4)}$$

Here, DIM expresses the number of dimensions, T_MAX expresses the length (in time) of the scenes being compared, and N_MAX expresses the number of endpoints being compared.

Judgment of Similarity for Dialog

The judgment of similarity for dialog is carried out by text matching for the spoken content in the two scenes.

If the spoken contents obtained from scenes A and B are respectively expressed as s(A) and s(B) and a function that measures the length of words and sentences that are common to scenes A and B is expressed as $C_f(s(A),s(B))$, the similarity $R_S(A,B)$ for dialog in the scenes A and B is expressed as shown in Equation 5 below.

$$R_S(A,B)=C_f(s(A),s(B))/S\_MAX \quad \text{(Equation 5)}$$

Here, S_MAX expresses the length of the character strings to be compared.

Judgment of Similarity for BGM

The judgment of similarity for BGM is carried out by measuring the amount of time for which the same continuous playback sound is included in both scenes.

The BGM waveforms or melodies obtained from scenes A and B at time t are respectively expressed as $g_A(t)$ and $g_B(t)$. In addition, if a function that measures correlation for $g_A(t)$ and $g_B(t)$ is expressed as $R(g_A(t),g_B(t))$ and a function that selects a longest region out of the regions for which high correlation has been obtained is expressed as $L_r(\Sigma_t\{R(g_A(t),g_B(t))\})$, the similarity $R_G(A,B)$ for BGM in the scenes A and B is expressed as shown in Equation 6 below.

$$R_G(A,B)=L_r(\Sigma_t\{R(g_A(t),g_B(t))\})/T\_MAX \quad \text{(Equation 6)}$$

Here, T_MAX expresses the time of scenes being compared.

The judgment results given below are obtained for the characteristic amounts based on the values calculated from the formulas given above.

Face . . . [1:same]>[Overall similarity for contours or color composition]>[Similarity for parts of contours or color composition]>[0:different]

Voiceprint . . . [1:same]>[At least one part is a continuous section that is the same. Some endpoints have different loci]>[0:different]

Gestures . . . [1:same]>[All points plot similar loci for a long time in a time series]>[All points plot similar loci for a short time. Alternatively, many points plot similar loci for a long time]>[Many points plot similar loci for a short time]>[0:different]

Dialog . . . [1:same]>[0:different]. Note that frequently occurring parts are excluded and only characteristic dialog is kept.

BGM . . . [1:same]>[Partially the same for entire length]>[Melody is the same but performance/recording method etc. is different. Different material with the same content]>[A different part is included]>[0:different]

It is assumed that the judgments described above are carried out using various thresholds.

The relationship between the two scenes is inferred based on the above judgment results ((4) in FIG. 10).

First the characteristic amounts described above are classified into the three categories shown in FIG. 11.

Examples of combinations of similarities calculated for the respective categories and relationships between scenes based on such similarities are shown in FIG. 12. Here, if the characteristic amounts belonging to a category are the same between scenes, the similarity is one, and if the characteristic amounts are completely different, the similarity is zero. Since the degrees of similarity that are actually calculated are arbitrary values in a range of zero to one, inclusive, the following is not an exhaustive list of the relationships between scenes that may be determined.

10. Effects of the Present Embodiment

It is possible to associate not only a video with substantially the same content as a video that is the standard for judging similarity, but also a wide range of videos with similar characteristics, such as videos in a series, a parody, and a video that is an animation version. In addition, based on which parts of a plurality of videos are similar, it is possible to further classify related videos according to their relationships with the video used as a standard.

It is also possible to evaluate similarity and/or a relationship between videos not only in units of the videos themselves but also in units of scenes (arbitrary sections).

By labeling characteristic amounts extracted from a video, it is possible to store characteristic amounts of a person who appears in the video as data, and based on such characteristic amounts, it is possible to evaluate who people appearing in another video resemble, and which parts are similar.

Using the characteristic amounts extracted from commercial content, it is possible to easily investigate whether a video that has been uploaded to a video sharing site or a personal web page infringes a copyright.

By compiling statistics on dialog and/or movement patterns for each person from the extracted characteristic amounts, it is possible to know the person's way of talking and gestures.

It is also possible to use (or replace) the movement pattern, dialog, voiceprint, and the like of a character registered in the database 106 for a new character who has been separately created.

It is also possible to quantitatively evaluate the extent to which someone doing an impersonation is similar to the person being impersonated and which characteristics are similar.

It is possible to use metadata of another video that is very similar for a video that has not been assigned metadata. It is also possible to assign the results of similarity judgments to respective videos as metadata.

By extracting a plurality of characteristic amounts individually from a video, it is possible to use the respective characteristic amounts to acquire information on characters and the like that is not related to a video or scene from the Web or from a similar item.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-52919 filed in the Japan Patent Office on Mar. 10, 2010, the entire content of which is hereby incorporated by reference.

What is claimed is:

1. An information processing apparatus comprising:
a characteristic amount extracting unit configured to extract a first plurality of characteristic amounts, which are information expressing characteristics of a video, from the video;
a labeling unit configured to identify a first portion of the first plurality of extracted characteristic amounts as corresponding to a person and a second portion of the first plurality of extracted characteristic amounts as corresponding to a background, and further configured to associate the first portion of extracted characteristic amounts with the person and the second portion with the background;
an audio analyzing unit configured to separate voice information of the person from background sound based upon lip movement of the person;
a matching degree judging unit configured to judge a degree of matching between the associated first portion of extracted characteristic amounts and second characteristic amounts of at least one other video;
a comparing unit configured to compare the first extracted characteristic amounts of one scene in the video from which the first extracted characteristic amounts have been extracted and a second plurality of characteristic amounts of at least one scene in the at least one other video; and
a relationship inferring unit configured to infer a relationship between the one scene in the video and the at least one scene in the at least one other video based on a comparison result of the comparing unit.

2. An information processing apparatus according to claim 1,
wherein the matching degree judging unit is configured to judge, for the first characteristic amounts, a degree of matching with the second plurality of characteristic amounts of the at least one other video that have been recorded in a storage unit, and
the comparing unit is further configured to compare, after it has been judged using at least one threshold that at least one of the first portion of extracted characteristic amounts matches at least one of the second characteristic amounts of the other video item, the first plurality of characteristic amounts of one scene in the video and the second plurality of characteristic amounts in one scene of the other video.

3. An information processing apparatus according to claim 1,
wherein the characteristic amount extracting unit is further configured to extract a plurality of characteristic amounts for each scene in the video.

4. An information processing apparatus according to claim 3,
wherein the characteristic amount extracting unit is further configured to assign index information, after at least one similar characteristic amount is obtained from a plurality of scenes in the video, wherein the index information indicates that the at least one characteristic amount is similar for the plurality of scenes.

5. An information processing apparatus according to claim 1,
wherein for the first portion of extracted characteristic amounts, the characteristic amount extracting unit is further configured to recognize a face of the person and detect body movements of the person, and
the labeling unit is further configured to associate the face and the body movements with the person.

6. The information processing apparatus according to claim 5, wherein the labeling unit is further configured to store the associated characteristic amounts for each person detected in a video for subsequent comparison.

7. An information processing method executed by an apparatus configured to process informational data from a first video, the method comprising acts of:
extracting, by at least an image analyzer of the apparatus operating in conjunction with a central processing unit of the apparatus, a first plurality of characteristic amounts, which are information expressing characteristics of a first video, from the first video;
identifying a first portion of the first extracted characteristic amounts as corresponding to a person and a second portion of the first extracted characteristic amounts as corresponding to a background;
associating the first portion of the first extracted characteristic amounts with the person;
recognizing, from the first portion of the first extracted characteristic amounts, a face of the person and body movements of the person;
recognizing the body movements of the person as comprising lip movement;
distinguishing spoken content from a background sound;
associating the spoken content with the person based upon the lip movement;
associating characteristic amounts for the face and the body movements with the person in a data store;
associating the second portion of the first extracted characteristic amounts with the background; and
judging a degree of matching between the first portion of the first extracted characteristic amounts and second characteristic amounts of at least a second video that have been stored in a storage unit.

8. The method of claim 7, further comprising inferring, after it has been judged using at least one threshold that at least one of the first portion of the first extracted characteristic amounts matches at least one of the second characteristic amounts of a second video, a relationship between one scene in the first video and one scene in the second video.

9. The method of claim 8, further comprising inferring the relationship between the one scene in the first video and the one scene in the second video based on comparing the first extracted characteristic amounts of the one scene in the first video and the second characteristic amounts from the one scene of the second video.

10. The method of claim 7, further comprising extracting respective pluralities of characteristic amounts for each scene in the first video.

11. The method of claim 10, further comprising assigning index information, after at least one similar characteristic amount is obtained from a plurality of scenes in the first video, wherein the index information indicates that the at least one characteristic amount is similar for the plurality of scenes in the first video.

12. The method of claim 7, further comprising identifying at least one degree of similarity between at least the second video and the first video based at least upon the associated characteristic amounts for the face and at least some of the body movements of the person.

13. The method of claim 12, wherein identifying at least one degree of similarity comprises evaluating a similarity between the person of the first video and a person of the at least the second video based upon the associated characteristic amounts for the face and the at least some of the body movements of the person.

14. The method of claim 13, wherein identifying at least one degree of similarity further comprises evaluating a similarity between the second characteristic amounts of the first video and background characteristic amounts of the at least the second video.

15. The method of claim 7, further comprising identifying the at least the second video as containing a same or similar person to the person of the first video.

16. A computer-readable memory device containing machine-readable instructions that, when executed by at least a central processor of a data-processing apparatus, cause the data-processing apparatus to carry out acts of:

extracting, by at least an image analyzer operating in conjunction with the central processor, a first plurality of characteristic amounts, which are information expressing characteristics of a video, from the video;

identifying a first portion of the first extracted characteristic amounts as corresponding to a person and a second portion of the first extracted characteristic amounts as corresponding to a background;

associating the first portion of the first extracted characteristic amounts with the person;

associating the second portion of the first extracted characteristic amounts with the background;

separating voice information from a background sound in audio from the video based upon a lip movement of the person;

judging a degree of matching between the first portion of extracted characteristic amounts and second characteristic amounts of at least one other video;

comparing, if the first portion of extracted characteristic amounts is found to match or be similar to the second characteristic amounts, the first plurality of extracted characteristic amounts of one scene in the video from which the first extracted characteristic amounts have been extracted and a second plurality of characteristic amounts of one scene in the at least one other video; and inferring a relationship between the one scene in the video and the one scene in the at least one other video based on a comparison result of the comparing unit.

* * * * *